United States Patent [19]

Barnadas

[11] Patent Number: 4,987,918
[45] Date of Patent: Jan. 29, 1991

[54] TRAP FOR STEAM CONDENSATES

[76] Inventor: Miguel S. Barnadas, Ronda Guinardo, 61 - 5° 1ª, 08029 Barcelona, Spain

[21] Appl. No.: 445,747

[22] Filed: Dec. 4, 1989

[30] Foreign Application Priority Data

Dec. 9, 1988 [ES] Spain ............................ 8900093[U]

[51] Int. Cl.[5] ............................................. F16T 1/34
[52] U.S. Cl. .................................. 137/171; 137/599
[58] Field of Search ................... 137/171, 183, 599; 165/142, 163, 110

[56] References Cited

U.S. PATENT DOCUMENTS

| | | | |
|---|---|---|---|
| 757,846 | 4/1904 | Simpson | 165/163 |
| 1,132,757 | 3/1915 | Ashton | 165/163 |
| 1,726,020 | 8/1929 | Garvey | 165/142 |
| 3,893,473 | 7/1975 | Breece | 137/171 |
| 4,478,238 | 10/1984 | Maddox | 137/171 |

Primary Examiner—Alan Cohan
Attorney, Agent, or Firm—Michael J. Striker

[57] ABSTRACT

Formed by a cylindrical body (10) provided on the upper third of the lateral surface thereof with respective cylindrical conduits (10) and (11) extending therefrom, the conduit (12) being provided with a further two conduits (16b) and (16), a direct purge valve (14) being provided in the latter, there having being included in the central body (10) a cylindrical body (13) as a thermometer jacket and coil (15) support. Entry to the coil is through the conduit (16b) and the exit at the bottom (15a), the condensate flowing in through the port (12), continuing to the passage (16b), entering the coil (15) and flowing out subsequently at (11), the condensate being discharged at the bottom of the coil (15), filling the main body (10) until it overflows.

2 Claims, 1 Drawing Sheet

TRAP FOR STEAM CONDENSATES

BACKGROUND OF THE INVENTION

Steam traps are devices for eliminating condensed water in steam circuits, both in heat-consuming apparatus and in actual steam supply lines.

In other words, the traps eject the fluid in liquid form and retain the vapour which has a high energy content.

The traps also have a secondary function which consists of eliminating any air and gases existing in heat-consuming apparatus at start-up and during operation.

At present, the criteria used for defining a good steam trap are as follows: it must allow rapid ejection of the condensates, be adaptable to variations in flow rate, be adaptable to variations in pressure before and after, be able to eliminate air and gases easily, be able to withstand harsh weather conditions and not be adversely affected by the presence of oil or other liquids that may have leaked from the coils.

With regard to the energy saving represented by its installation, the following aspects should be taken into consideration: the leakage of steam occurring in its presence must be minimum, the energy for water retention must be recuperable and it must allow the adaptation of insulation.

Certain other things must also be considered in connection with the installation and maintenance, such as: minimum cost of purchase, ease of assembly, reduced maintenance costs, operability in any position, capacity to withstand water hammers, resistance to internal and external corrosion, ability to function in the presence of impurities and furring, and quick, easy diagnosis of operation.

There are on the market, and can therefore be considered representative of the state of the art, a number of mechanical steam traps, such as the closed float, free float, float and lever, tray and inverted float types.

There are also other traps of the so-called thermostatic group, such as the expanding single-metal type.

There is a third, thermodynamic group and a fourth or mixed group, the most representative of which are the pulse and labyrinth type steam traps.

All the aforementioned groups, without exception, have a number of advantages, but they also have their disadvantages. The object of the subject invention is to eliminate the latter completely.

SUMMARY OF THE INVENTION

The steam trap according to the invention is formed by a steel body containing an adjusted, sized coil.

The body is cylindrical in shape and consists of a tube closed hermetically at the ends and connected to the outside only by the two inlet and outlet pipes of the condenser.

These pipes are located on the top part and lie perpendicular to the axis of the body, measuring between three-eighths and three-quarters of an inch in section.

The size of the cylindrical body will depend on the trap's discharge capacity as well as its pressure and design and may be between 30 and 70 mm., the length varying between 50 and 200 mm.

The coil is made from sized pipe and is wound around a central guide tube. The inlet to the coil starts in the body's branch piping, corresponding to the trap inlet, and the other end of the coil finishes in the bottom part of the body.

The length and diameter of the coil are standard and depend always on the differential pressure that exists between the inlet and outlet of the apparatus, that is to say, the pressure of the steam itself and the flow rate.

Next to the inlet pipe is a by-pass valve that allows direct circulation around, and without having to pass through the coil, thereby increasing the flow capacity manually.

Other details and characteristics the subject invention will be made manifest in the description given below, which refers to the drawings accompanying this Specification and in which the preferred details are represented somewhat schematically. These details are given as an example, with reference to a possible case of practical embodiment, and are not meant as any kind of limit; therefore, this description should be considered as illustrative and not restricting in any way.

BRIEF DESCRIPTION OF THE DRAWINGS

FIG. no. 1 is an elevational cross-sectional view of the steam trap according to the invention; and FIG. no. 2 shows a schematic view of a conventional steam installation with a steam trap according to the invention.

DETAILED DESCRIPTION OF THE PREFERRED EMBODIMENT

Figures 1, 2:
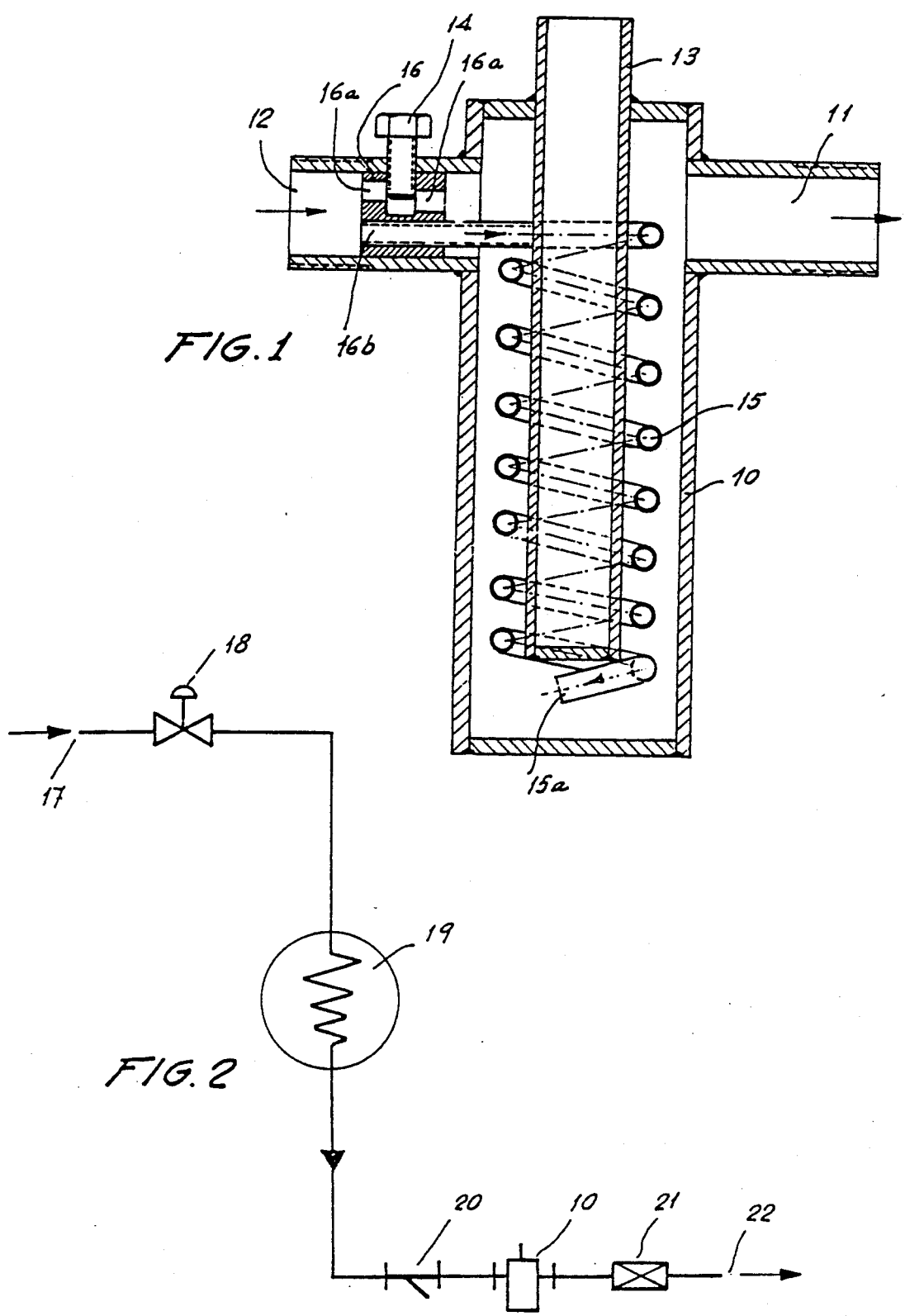

In one of the preferred embodiments of the steam trap invention, and as can be seen from FIG. no. 1, this steam trap pertains to the so-called labyrinth steam trap group, which type is based on the system of facilitating the passage of the fluid in liquid state and hindering the passage of the steam to avoid any energy loss.

Saturated steam at relatively low pressures, for example 5 Kg/sq.cm., occupies a large volume, somewhere in the region of 300 times the volume of the water at the same temperature. This is why there is a small-diameter coil that serves to hinder the passage of large volumes and allow the passage of condensates that are smaller in volume and have a greater specific weight.

Another physical consideration is that the resistance of the flow of condensed water in friction against the coil walls is much greater than that of steam, which, in the event of there being little condensate, would lead to a considerable drop in the speed of passage of the steam. In other words, if the condensate flow rate is low, the steam would come out at the same speed as the condensate, which is relatively slow, and a small amount of steam would be lost as the latter is of low density. Its flow weight-wise would be negligible and therefore the actual condensate itself produces a "plug" effect that avoids any leakage of steam.

The condensate enters through inlet (12), branching towards passage (16b) and into the coil (15); for the condensate to get out it has to circulate through the whole coil, losing pressure at each turn. This loss of pressure means that the condensate has become revapourised at each of the turns forming the inner surfaces of the coil. This is why discharge of the condensate through (11) is delayed, thereby avoiding the loss of live steam, the condensate being discharged at the bottom of the coil (15), the main body (10) filling right up to overflowing and said condensate, as mentioned previously, coming out through pipe (11) for greater convenience; at the inlet to (12), parallel to pipe (16b) and connected with the coil (15), is another pipe (16) in which there is a screw (14) that acts as a direct discharge valve for ejecting a larger amount of condensates, if necessary, just by tightening or loosening it (14). The cylindrical body (13) occupying the central part acts as basic means for placing a thermometer and as a support for said coil, the steam mixed with the condensate entering through pipe (16b) and the condensate circulating through the coil (15) to the outlet (15a).

The trap described above has no mechanisms such as floats, discs, bellows, levers, stoppers or others and is therefore free from the usual failures caused by wear, friction or banging of the main components of traps such as those described at the beginning of this Specification.

This steam trap requires no preventive maintenance as it is hermetically sealed and it is not possible to carry out periodic overhauls or controls.

It is very good at ejecting non-condensable gases and air as it has a free outlet, and it is not affected by the typical air or vapour locks.

As regards its applications, the improved steam trap is applicable to all processes using saturated steam as a heat-carrying fluid, such as: coils, batteries, small boilers, cylinders, reactors and so on.

It is also applicable to steam lines for the purpose of draining them and eliminating the water carried along by the steam or which is formed during its circulation.

It is capable of working under the worst operating conditions, as can be seen from the following.

It operates correctly under low differential pressures, under strong back pressures at the trap outlet.

It allows large variations in the inlet and outlet pressures, or upstream and downstream.

It is totally versatile at different temperatures of the steam and the condensate, is not affected by water hammers, can take large variations in condensate flow rate and ejects the gases easily as they arise.

As can be seen from FIG. no. 2, the steam trap in question, fitted to an installation, would work as follows: the steam would enter through (17) its inlet being regulated by valve (18) letting sufficient flow through for the heat consumer (19); it would then be filtered through the filter (20) and go directly into the trap (10) through inlet (16), the condensate subsequently coming out through (11) and passing through the check valve (21) which prevents backflow of condensates from other units set up in parallel, the condensate finally being ejected through (22).

After looking at the drawings and reading our explanation of them here, it will be understood that the the subject invention provides a simple, effective device which is very easy to make and use and undoubtedly gives a new industrial result.

It should be stated, for the record, that the steam trap of the subject invention may be changed and modified according to circumstances and practicality, provided that the variations introduced do not alter or modify in any way the essence of the device as summarised in the following claims.

I claim:

1. A labyrinth trap for steam condensate, comprising a cylindrical body having a generatrice and top and bottom portions; inlet and outlet cylindrical conduits extending from said top portion of said cylindrical body in diametrically opposite directions perpendicular to said cylindrical body; a cylindrical pipe supported inside of said cylindrical body and having a generatrice which is parallel to the generatrice of said cylindrical body; a cylindrical member arranged in the inlet cylindrical conduit and having a first bore; and coil tubular member wound around said cylindrical pipe and having an upper end communicating with said first bore of said cylindrical member, and a lower end that opens near the bottom portion of said cylindrical body, said cylindrical member having a second bore extending parallel to said first bore, said labyrinth trap further comprising a drainage valve communicating with said second bore.

2. A labyrinth trap as set forth in claim 1, wherein said coil tubular member has a straight portion defining said upper end and extending through said first bore.

* * * * *